US012656661B2

(12) United States Patent
Zhang et al.

(10) Patent No.: US 12,656,661 B2
(45) Date of Patent: Jun. 16, 2026

(54) PAN-TILT CAMERA EQUIPMENT

(71) Applicant: Shenzhen Oceanwing Smart Innovations Technology Co., Ltd, Shenzhen (CN)

(72) Inventors: Yiyin Zhang, Shenzhen (CN); Qiao Zhang, Shenzhen (CN)

(73) Assignee: Shenzhen Oceanwing Smart Innovations Technology Co., Ltd., Shenzhen (CN)

( * ) Notice: Subject to any disclaimer, the term of this patent is extended or adjusted under 35 U.S.C. 154(b) by 124 days.

(21) Appl. No.: 18/627,938

(22) Filed: Apr. 5, 2024

(65) Prior Publication Data

US 2024/0337906 A1 Oct. 10, 2024

(30) Foreign Application Priority Data

Apr. 7, 2023 (CN) .......................... 202310395043.3

(51) Int. Cl.
| | |
|---|---|
| *G03B 17/12* | (2021.01) |
| *G03B 17/08* | (2021.01) |
| *G03B 17/50* | (2021.01) |
| *G03B 17/56* | (2021.01) |
| *H02J 7/82* | (2026.01) |

(Continued)

(52) U.S. Cl.
CPC ............. *G03B 17/12* (2013.01); *G03B 17/08* (2013.01); *G03B 17/50* (2013.01); *G03B 17/561* (2013.01); *H02J 7/82* (2026.01); *H02S 30/10* (2014.12); *H02S 40/38* (2014.12)

(58) Field of Classification Search
CPC ........ G03B 17/12; G03B 17/08; G03B 17/50; G03B 17/561; H02S 30/10; H02S 40/38; H02J 7/0048
See application file for complete search history.

(56) References Cited

U.S. PATENT DOCUMENTS

2009/0179988 A1 7/2009 Reibel et al.

FOREIGN PATENT DOCUMENTS

| | | |
|---|---|---|
| CN | 105791693 A | 7/2016 |
| CN | 109302144 A | 2/2019 |
| CN | 109672854 A | 4/2019 |

(Continued)

OTHER PUBLICATIONS

Jun. 28, 202463 (CN) International Search Report of PCT/CN2024/084202.
Jun. 28, 2024 (CN)—Written Opinion of PCT/CN2024/084202.

*Primary Examiner* — Minh Q Phan
(74) *Attorney, Agent, or Firm* — Banner & Witcoff, Ltd.

(57) ABSTRACT

This application discloses a control method, system, device, and storage medium for a pan-tilt camera device. The method comprises: obtaining the current battery level and current environment of the pan-tilt camera device; after determining that both the current battery level and current environment meet preset conditions, controlling the pan-tilt camera device to rotate within the monitoring range to a target angle, so that the photovoltaic panel is at the optimal charging angle, achieving a balance between charging and monitoring, where the target angle is determined based on the charging current value and charging voltage value of the photovoltaic panel. This method can achieve a balance between charging and monitoring for the pan-tilt camera device.

18 Claims, 8 Drawing Sheets

Acquire the current battery level and the current environment of the pan-tilt camera device.

110

After determining that both the current battery level and the current environment meet the preset conditions, control the pan-tilt camera device to rotate within the monitoring range to the target angle, wherein the photovoltaic panel is at the optimal charging angle, achieving a balance between charging and monitoring.

120

(51) Int. Cl.
    *H02S 30/10*        (2014.01)
    *H02S 40/38*        (2014.01)

(56)                References Cited

FOREIGN PATENT DOCUMENTS

CN         111083433 A    4/2020
CN         111083433 B  * 11/2024   ................ H02J 7/35

* cited by examiner

10

The control system

100

The pan-tilt camera device

200

The server

PAN-TILT CAMERA EQUIPMENT

The present application claims priority to CN application Ser. No. 202310395043.3, filed on Apr. 7, 2023. The above application is incorporated by reference in its entirety.

FIELD

This application relates to the field of surveillance technology, particularly to a control method, system, device, and storage medium for pan-tilt camera equipment.

BACKGROUND

The application of camera devices with integrated solar panels is becoming increasingly widespread. These devices typically generate electricity through solar panels and store it in batteries, ensuring that the camera can continue to operate during the night and on cloudy or rainy days with minimal sunlight. However, due to the limitations of the monitoring area of the camera equipment, it is often difficult to reconcile the optimal angle for solar panel sunlight absorption with the best monitoring angle of the camera.

SUMMARY

The examples of this application provide a control method, system, device, and storage medium for pan-tilt camera equipment, which can achieve a balance between charging and monitoring.

The first aspect of this application provides a control method for pan-tilt camera equipment, wherein the pan-tilt camera equipment comprises a photovoltaic panel used for charging the pan-tilt camera equipment. The method comprises acquiring a current battery level and a current environment of the pan-tilt camera equipment; after determining that both the current battery level and current environment meet preset conditions, controlling the pan-tilt camera equipment to rotate within the monitoring range to a target angle, so that the photovoltaic panel is at the optimal charging angle, achieving a balance between charging and monitoring, and where the target angle is determined based on the charging current value and charging voltage value of the photovoltaic panel.

The second aspect of this application provides a pan-tilt camera system, which comprises the pan-tilt camera equipment and a server. The server is connected to and cooperates with the pan-tilt camera equipment to implement the aforementioned method applied to the pan-tilt camera equipment.

The third aspect of the application provides a pan-tilt camera system comprising a pan-tilt camera equipment, a server, and a mobile terminal. The mobile terminal is connected to the pan-tilt camera equipment and is used to send control commands to the server to implement the aforementioned method applied to the pan-tilt camera equipment.

The fourth aspect of the application provides a device for controlling a pan-tilt camera equipment, the device including a memory and one or more processors. The memory stores executable instructions, and the one or more processors execute the executable instructions to cause the device to implement the aforementioned method applied to the pan-tilt camera equipment.

The beneficial effect of the application is that, unlike the existing technology, this application controls the pan-tilt camera equipment to rotate within a predetermined monitoring range to a target angle after determining that the current battery level and the current environment of the pan-tilt camera equipment meet preset conditions. This allows the photovoltaic panel to be at the optimal charging angle, achieving a balance between charging and monitoring. Thus, it addresses the problem in related technology where it is difficult to balance the installation angle of the integrated solar panel for charging and the optimal monitoring view angle of the camera.

BRIEF DESCRIPTION OF THE DRAWINGS

To more clearly illustrate the technical solutions in the examples of this application, a brief introduction to the drawings used in the description of the examples will be provided below. It is evident that the drawings described below are only some examples of this application, and for those of ordinary skill in the art, other drawings can be obtained based on these drawings without creative effort. Among them.

BRIEF DESCRIPTION

The following will combine the drawings in the examples of this application to clearly and completely describe the technical solutions in the examples of this application. It should be understood that the specific examples described here are only for explaining this application and are not intended to limit this application. Additionally, it should be noted that, for the sake of simplicity, the drawings only show the parts related to this application and not the entire structure. Based on the examples in this application, all other examples obtained by those of ordinary skill in the art without making inventive efforts fall within the scope of protection of this application.

The term "example" mentioned in this document means that the specific features, structures, or characteristics described in connection with the example may be comprised in at least one example of this application. The phrase does not necessarily refer to the same example in all positions in the specification, nor is it an independent or alternative example that is mutually exclusive with other examples. Those skilled in the art will explicitly and implicitly understand that the examples described herein can be combined with other examples.

During the research and practice of the related technology, the inventors of this application found that the related integrated solar panel camera devices can generally only meet either an optimal angle for the installation position for solar absorption or an optimal monitoring angle of the camera, but cannot simultaneously balance the optimal angle for the installation position for solar absorption and the optimal monitoring angle of the camera.

Therefore, this application provides a control method for a pan-tilt camera device to solve the aforementioned problems.

Figure 1:
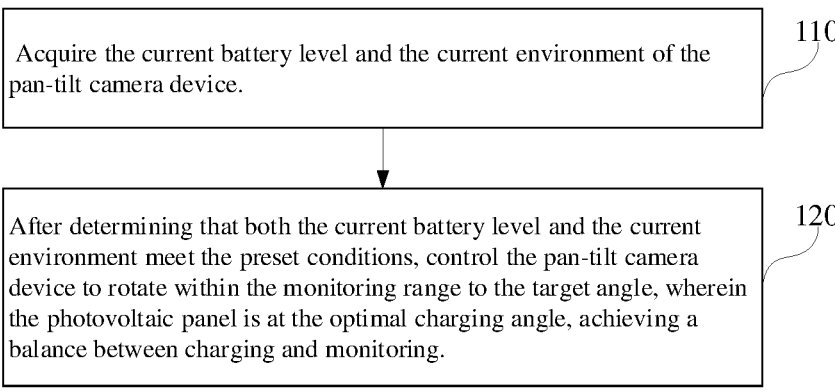
FIG. 1 is a flowchart illustrating a first example of a control method for a pan-tilt camera equipment provided by this application.

The following is an introduction to the control method for the pan-tilt camera device provided by this application. Please refer to FIG. 1, which is a flowchart of the first example of the control method for the pan-tilt camera device provided by this application. The method comprises:

Step 110: A server may obtain the current battery level and the current environment of the pan-tilt camera device.

The current environment can be a time period of a time zone where the pan-tilt camera device is located. For example, the time period can be directly divided into night time and daytime.

Alternatively, the time period can be subdivided into early morning, morning, forenoon, afternoon, evening, night, and late-night time periods.

In addition, the current environment may include at least one of the current season, weather type, temperature, wind force, humidity, or the like.

Optionally, the current environment of the pan-tilt camera device can be obtained from a third-party weather information platform.

Step 120: After determining that both the current battery level and the current environment meet the preset conditions, the server may control the pan-tilt camera device to rotate within the monitoring range to the target angle, so that the photovoltaic panel is at the optimal charging angle, achieving a balance between charging and monitoring.

Here, the current environment comprises at least one of factors including weather, wind force, humidity, temperature, and light intensity.

The preset conditions may be that the battery level of the pan-tilt camera device is below a preset level and the weather is clear. It can be understood that if the weather is clear, then there is sunlight in the current environment, and the corresponding light intensity is present, and therefore, the pan-tilt camera device can use the photovoltaic panel for charging.

The preset conditions may be that the battery level of the pan-tilt camera device is below a preset level and the humidity is less than a preset humidity value. It can be understood that the lower the humidity, the higher the temperature, and the cause of high temperature is often due to clear weather, leading to corresponding high light intensity.

The preset conditions may be that the battery level of the pan-tilt camera device is below a preset level and the temperature is greater than a preset temperature value. It can be understood that the cause of high temperature is often due to clear weather, leading to corresponding high light intensity.

In other examples, the preset conditions may also comprise the pan-tilt camera device's battery level being below a preset level, clear weather with humidity lower than a preset humidity value.

In other examples, the preset conditions may also comprise the pan-tilt camera device's battery level being below a preset level and clear weather with temperature higher than a preset temperature value.

In other examples, the preset conditions may also comprise the pan-tilt camera device's battery level being below a preset level, clear weather with humidity lower than a preset humidity value, and temperature higher than a preset temperature value.

In other examples, the preset conditions may also comprise the pan-tilt camera device's battery level being below a preset level, clear weather with wind force less than a preset wind force value.

In other examples, the preset conditions may also comprise the pan-tilt camera device's battery level being below a preset level, and clear weather with humidity lower than a preset humidity value, and wind force less than a preset wind force value.

In other examples, the preset conditions may also comprise the pan-tilt camera device's battery level being below a preset level and clear weather with temperature higher than a preset temperature value, and wind force less than a preset wind force value.

In other examples, the preset conditions may also comprise the pan-tilt camera device's battery level being below a preset battery level, and clear weather with humidity below a preset humidity value, temperature above a preset temperature value, and wind force below a preset wind force value.

Specifically, the preset battery level can be 30%, 40%, 50%, or 60% of the rated battery capacity of the pan-tilt camera device.

For example, if the battery level of the pan-tilt camera device is below 30% of the rated capacity and it is currently during the "daytime period," then it can be indicated that both the current battery level and the current environment meet the preset conditions.

Here, the target angle is determined based on the current battery level and the current environment of the pan-tilt camera device, and the target angle is the angle that the pan-tilt camera device needs to rotate to when the photovoltaic panel is at the optimal charging angle. The target angle can be determined using the charging current value and charging voltage value of the photovoltaic panel.

For instance, if the current angle of the pan-tilt camera device is 0 degree horizontally, and the optimal charging angle for the photovoltaic panel is 45 degrees horizontally, if the pan-tilt camera device and the photovoltaic panel rotate synchronously, then 45 degrees horizontally can serve as the target angle. That is, if the pan-tilt camera device is controlled to rotate within the monitoring range to 45 degrees horizontally, the photovoltaic panel will also be at the optimal charging angle, achieving a balance between charging and monitoring.

It should be noted that in other examples, the pan-tilt camera device and the photovoltaic panel may not rotate synchronously. In cases where the pan-tilt camera device and the photovoltaic panel do not rotate in sync, the target angle reached by the pan-tilt camera device may differ from the optimal charging angle of the photovoltaic panel.

In some examples, the charging current and voltage values of the photovoltaic panels can be collected in real-time at a preset time. Based on the collected charging current and voltage values, the power corresponding to the pan-tilt camera equipment at each preset time is determined. Then, the relationship among each environment corresponding to the photovoltaic panels at each preset time, the angle of the photovoltaic panels, and the calculated power is recorded and saved, which can be in the form of a table or a chart. Subsequently, based on the current battery level and the current environment of the pan-tilt camera equipment, the target power can be determined directly from the existing table by finding the corresponding multiple power values under the same environment. Among these, the maximum power value can be taken as the target power, and the angle corresponding to the target power is the target angle that the pan-tilt camera equipment needs to rotate to.

In some examples, the monitoring range can be set according to the actual design needs, for example, by using key monitoring areas and a maximum field of view to determine the monitoring range.

In an example, by pre-determining the monitoring range of the pan-tilt camera equipment, the system controls the pan-tilt camera equipment to rotate to the target angle within the determined monitoring range, after determining that the current battery level and current environment meet the preset conditions. This ensures that the photovoltaic panels are at the optimal charging angle, achieving a balance between charging and monitoring. Thus, this application improves the issue related to the existing technology, which cannot balance the installation position of the integrated solar panel charging angle and the optimal monitoring angle of the camera.

This application provides a control method for a gimbal (e.g., pan-tilt) camera device in the second example, which can comprise the following steps:

Step 210: A server may acquire the current battery level and the current environment of the gimbal camera device.

Step 220: After determining that both the current battery level and the current environment meet preset conditions, the server may obtain the target angle corresponding to the current environment.

Herein, the target angle corresponding to the current environment can be determined based on an existing relationship between the environment and the angle. For example, one can find from the angle-environment relationship table an environment that is the same as, substantially similar as, or most similar to the current environment, and use the angle corresponding to the environment that is the same as, substantially similar as, or most similar to the current environment as the target angle corresponding to the current environment.

Step 230: The server may control the pan-tilt camera device to rotate within the monitoring range to the target angle, so that the photovoltaic panel is at the optimal charging angle, achieving a balance between charging and monitoring.

The target angle is determined based on the charging current value and charging voltage value of the photovoltaic panel.

Step 210 and Step 230 have the same or similar technical solutions as the aforementioned examples, which are not elaborated here.

In this example, by pre-determining the monitoring range of the pan-tilt camera device, and after determining that the current battery level and current environment of the pan-tilt camera device meet the preset conditions, the device is controlled to rotate to the target angle within the established monitoring range, so that the photovoltaic panel is at the optimal charging angle. This achieves a balance between charging and monitoring, thereby addressing the issue related to the inability to balance the installation position of the integrated solar panel charging angle with the optimal monitoring angle of the camera.

In some examples, obtaining the target angle corresponding to the current environment mentioned in the above step 220 can specifically comprise the following steps:

Step 310: The server may obtain an angle-environment relationship table; wherein the angle-environment relationship table is derived from the power obtained using the charging current values and charging voltage values of the photovoltaic panel at various angles under the same or substantially similar environment.

For example, the different powers corresponding to different angles in the same or substantially similar environment can be shown as in Table 1, Table 2, and Table 3:

TABLE 1

| Environment | Angle | Power |
|---|---|---|
| Spring-Cloudy-24° C.-Level 2 Wind | Angle α1 | P1 |
| Spring-Cloudy-24° C.-Level 2 Wind | Angle α2 | P2 |
| Spring-Cloudy-24° C.-Level 2 Wind | Angle α3 | P3 |

TABLE 2

| Environment | Angle | Power |
|---|---|---|
| Winter-Sunny-28° C.-Level 2 Wind | Angle α4 | P4 |
| Winter-Sunny-28° C.-Level 2 Wind | Angle α5 | P5 |
| Winter-Sunny-28° C.-Level 2 Wind | Angle α6 | P6 |

TABLE 3

| Environment | Angle | Power |
|---|---|---|
| Autumn-Sunny-28° C.-Level 4 Wind | Angle α7 | P7 |
| Autumn-Sunny-28° C.-Level 4 Wind | Angle α8 | P8 |
| Autumn-Sunny-28° C.-Level 4 Wind | Angle α9 | P9 |

The server may find the highest power value from Table 1, Table 2, and Table 3, respectively, and take the angle corresponding to the maximum power value as the target angle for each environment to form an angle-environment relationship table. For example, if the maximum power value in Table 1 is P2, in Table 2 it is P5, and in Table 3 it is P8, then the angle-environment relationship table can be illustrated as in the following Table 4:

TABLE 4

| Environment | Angle | Power |
|---|---|---|
| Spring-Cloudy-24° C.-Level 2 Wind | Angle α2 | P2 |
| Winter-Sunny-28° C.-Level 2 Wind | Angle α5 | P5 |
| Autumn-Sunny-28° C.-Level 4 Wind | Angle α8 | P8 |

Step 320: The sever may obtain the target angle corresponding to the current environment from the angle-environment relationship table.

Assuming the current environment is similar to winter—clear day −28° C.—level 2 wind, the server then select angle α5 from the angle-environment relationship table as the target angle corresponding to the current environment.

The process of the third example of the control method for the pan-tilt camera device provided in this application can comprise the following steps:

Step 410: The server may obtain the current battery level of the pan-tilt camera device and the current environment.

Step 420: After determining that the current battery level is below the preset level, and the current environment meets the charging conditions for the photovoltaic panel, the server may control the pan-tilt camera device to rotate within the monitoring range to the target angle, so that the photovoltaic panel is at the optimal charging angle, achieving a balance between charging and monitoring.

Here, the current environment meets the charging conditions for the photovoltaic panel when the pan-tilt camera device is currently in the daytime period of its time zone.

In other examples, when the battery level of the pan-tilt camera device is relatively sufficient, or when the current environment is during the nighttime period of the local time zone, or during weak sunlight conditions such as overcast or rainy weather, the pan-tilt camera device is controlled to prioritize the monitoring angle, automatically returning to the original optimal monitoring angle set by the user.

The target angle is determined based on the charging current value and charging voltage value of the photovoltaic panel.

This example, by pre-determining the monitoring range of the pan-tilt camera device, the server may control the pan-tilt camera device to rotate within the established monitoring range to the target angle when the current battery level and current environment meet the preset conditions, so that the photovoltaic panel is at the optimal charging angle. This achieves a balance between charging and monitoring, thereby addressing the problem related to the technology that cannot balance the installation position of the integrated solar panel charging angle with the camera's optimal monitoring angle.

The control method for the pan-tilt camera device provided in the fourth example of this application may comprise the following steps:

Step 510: the server may control the pan-tilt camera device to rotate, and determine 1) the maximum field of view range of the pan-tilt camera device, and 2) the key monitoring area corresponding to the pan-tilt camera device, where the key monitoring area is within the maximum field of view range.

It can be understood that since the pan-tilt camera device can rotate, the maximum field of view range refers to the largest field of view that the pan-tilt camera device can cover when it rotates to the maximum turning angle in all directions.

The key monitoring area can be set manually according to actual needs. For example, users can first set the key monitoring area on a mobile terminal and send the related data of the key monitoring area to the pan-tilt camera device.

Step 520: Based on the key monitoring area and the maximum field of view range, the server may determine the monitoring range, where the monitoring range is within the maximum field of view range, and when the pan-tilt camera device rotates within the monitoring range, the key monitoring area is always within the field of view of the pan-tilt camera device.

Figure 2:
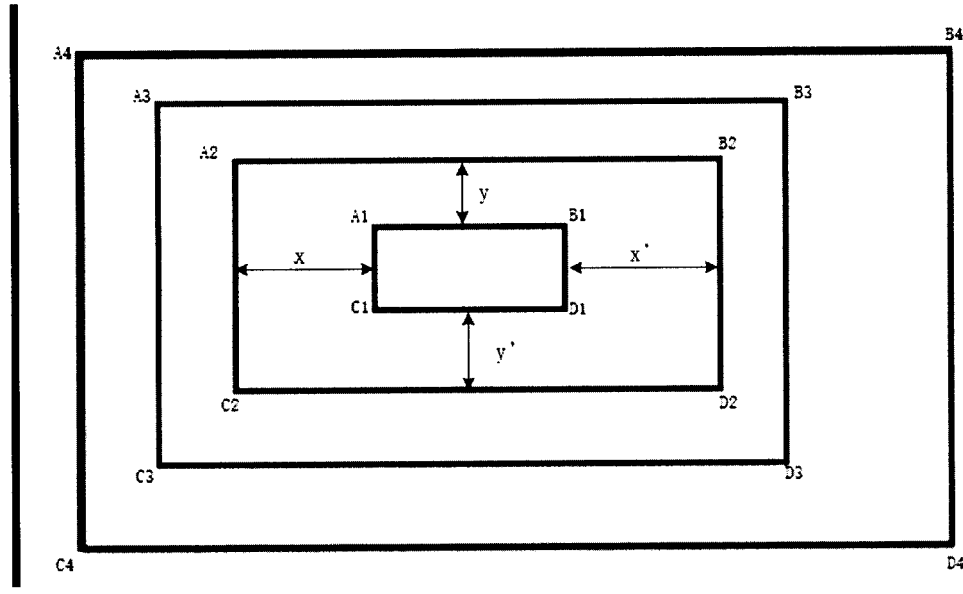
FIG. 2 is a structural diagram showing a monitoring range in a control method for a pan-tilt camera equipment provided by this application.

For example, referring to FIG. 2, the rectangular area A1B1C1D1 in FIG. 2 is the key monitoring area, the rectangular area A2B2C2D2 is the field of view range corresponding to the pan-tilt camera device itself, the rectangular area A4B4C4D4 is the maximum field of view range that the pan-tilt camera device can cover when rotating, and the rectangular area A3B3C3D3 is the maximum field of view range obtained by the pan-tilt camera device moving horizontally and vertically and being able to cover the key monitoring area, which is also the monitoring range.

Specifically, suppose the coordinates of the four endpoints A1, B1, C1, and D1 in the key monitoring area A1B1C1D1 are (x1, y1), (x2, y2), (x3, y3), and (x4, y4), respectively. The maximum field of view of the pan-tilt camera itself is the rectangular area A2B2C2D2, with the coordinates of the four endpoints A2, B2, C2, and D2 being (x5, y5), (x6, y6), (x7, y7), and (x8, y8), respectively.

When A2 moves to A1, then D2 moves to D3; when B2 moves to B1, then C2 moves to C3; when C2 moves to C1, then B2 moves to B3; when D2 moves to D1, then A2 moves to A3. Therefore, when the pan-tilt camera moves horizontally and vertically, and is able to cover the key monitoring area A1B1C1D1, the maximum field of view obtained is the area enclosed by the rectangular area A3B3C3D3.

Step 530: The server may obtain the current battery level and current environment of the pan-tilt camera device.

Step 540: After determining that both the current battery level and current environment meet the preset conditions, the server may control the pan-tilt camera device to rotate within the monitoring range to the target angle, so that the photovoltaic panel is at the optimal charging angle, achieving a balance between charging and monitoring.

Here, the target angle is determined based on the charging current value and charging voltage value of the photovoltaic panel.

Steps 530 and 540 have the same or similar technical solutions as the above-mentioned examples, which are not repeated here.

This example, by pre-determining the monitoring range of the pan-tilt camera device, the server controls the device to rotate to the target angle within the established monitoring range when the current battery level and current environment meet the preset conditions, so that the photovoltaic panel is at the optimal charging angle. This achieves a balance between charging and monitoring, thereby addressing the issue where related technologies cannot balance the installation position of the integrated solar panel charging angle and the optimal monitoring angle of the camera.

The control method for the pan-tilt camera device provided by this application in the fifth example can comprise the following steps:

Step 610: The server may control the pan-tilt camera device to rotate, and determine the maximum field of view of the pan-tilt camera device, and the corresponding key monitoring area, where the key monitoring area is within the maximum field of view.

Step 620: Based on the key monitoring area and the maximum field of view, the server may determine the monitoring range, where the monitoring range is within the maximum field of view, and when the pan-tilt camera device rotates within the monitoring range, the key monitoring area is always within the field of view of the pan-tilt camera device.

Step 630: Within the monitoring range, the server may control the pan-tilt camera device to rotate horizontally and vertically, and collect the charging current value and charging voltage value of the photovoltaic panel when the pan-tilt camera device rotates horizontally and vertically to each angle.

In some examples, horizontal rotation can be rotating left or right, and vertical rotation can be rotating up or down.

The previously mentioned key monitoring area is illustrated as rectangle A1B1C1D1, with the coordinates of the four corners A1, B1, C1, D1 being (x1, y1), (x2, y2), (x3, y3), (x4, y4) respectively. The maximum field of view of the pan-tilt camera itself is rectangle A2B2C2D2, with the coordinates of the four corners A2, B2, C2, D2 being (x5, y5), (x6, y6), (x7, y7), (x8, y8) respectively, for explanation.

The maximum distance the pan-tilt camera can rotate to the left in the horizontal direction is |x5−x1|, which is Δx in FIG. 2, and to the right is |x8−x4|, which is Δx'. In the vertical direction, the maximum distance for upward rotation is |y5−y1|, which is Δy, and for downward rotation is |y8−y4|, which is Δy'.

Step 640: The server may determine the power value based on the charging current value and the charging voltage value.

Here, the power value can be obtained by multiplying the charging current value by the charging voltage value.

Step 650: The server may determine the optimal charging angle using the power value.

For example, could the server may select the largest power value from the determined set and use the corresponding angle as the optimal charging angle for the photovoltaic panel.

Step 660: The server may obtain the current battery level and the current environment of the pan-tilt camera.

Step 670: After determining that both the current battery level and the current environment meet the preset conditions, the server may control the pan-tilt camera to rotate within the monitoring range to the target angle, so that the photovoltaic panel is at the optimal charging angle, achieving a balance between charging and monitoring.

Here, the target angle is determined based on the charging current value and the charging voltage value of the photovoltaic panel.

In this example, by pre-determining the monitoring range of the pan-tilt camera, the server controls the pan-tilt camera to rotate to the target angle within the established monitoring range when the current battery level and the current environment meet the preset conditions, so that the photovoltaic panel is at the optimal charging angle. This achieves a balance between charging and monitoring, thereby addressing the issue where related technologies cannot balance the installation position of the integrated solar panel charging angle and the optimal monitoring angle of the camera.

In some examples, the bisection method can be used to find the position that the pan-tilt camera needs to move to. This can be referred to in FIG. 3 and combined with the process described in steps 630 to 650 as follows:

1) Within the monitoring range, the server may control the pan-tilt camera to horizontally rotate to the first position, collect the charging current value and charging voltage value of the photovoltaic panel at the first position to obtain the first power value.

2) The server may control the pan-tilt camera to horizontally rotate to the second position, collect the charging current value and charging voltage value of the photovoltaic panel at the second position to obtain the second power value; where the second position is located on one side of the first position.

Figure 3:
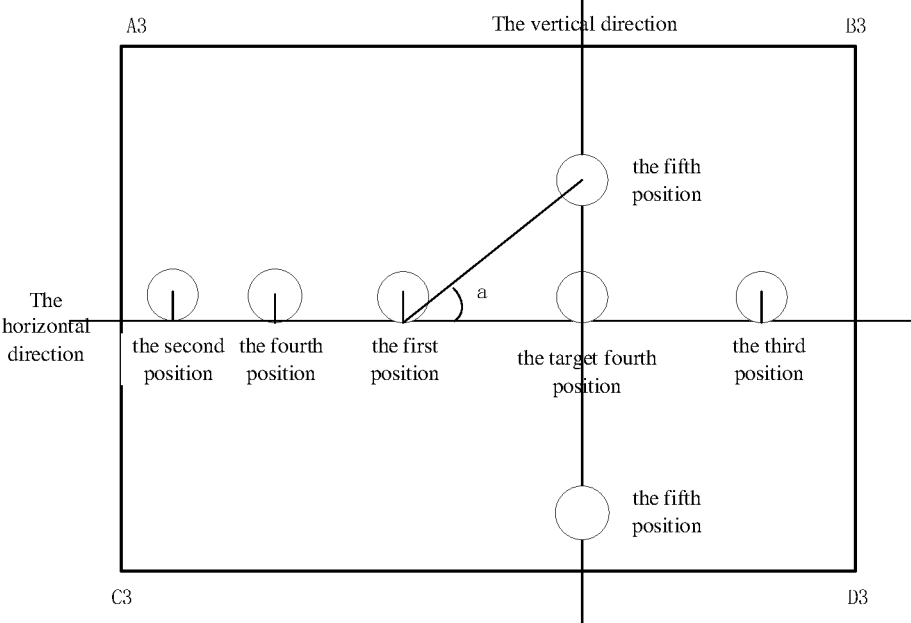
FIG. 3 is a diagram illustrating determination of an optimal charging angle in a control method for a pan-tilt camera equipment provided by this application.

In this context, the second position can be located to the left of the first position as shown in FIG. 3.

In other examples, the second position can also be located to the right of the first position.

3) In response to the second power value being less than the first power value, the server may control the pan-tilt camera to horizontally rotate to the third position, and collect the charging current value and charging voltage value of the photovoltaic panel at the third position to obtain the third power value, where the third position is located on the other side of the first position.

Here, horizontal rotation can be either to the left or to the right.

When the second power value corresponding to the second position is less than the first power value corresponding to the first position, then the server controls the pan-tilt camera to horizontally rotate to the third position, as shown in FIG. 3. Since the second position is on the left side of the first position, the server controls the pan-tilt camera to horizontally rotate to the right to the third position to obtain the third power value.

If the second position is located to the right of the first position, then the server may correspondingly control the pan-tilt camera to horizontally rotate to the left to the third position to obtain the third power value.

When the pan-tilt camera horizontally rotates to one side, if the power value after rotation is less than the power value before rotation, the server indicates that the direction of rotation is incorrect. In order to save rotation time and improve efficiency, it is possible for the pan-tilt camera to return to the original position before movement and then move in the opposite direction.

4) In response to the third power value being less than the first power value, the server may control the pan-tilt camera to horizontally rotate to several fourth positions, and collect the charging current value and charging voltage value of the photovoltaic panel at several fourth positions to obtain the fourth power value corresponding to each fourth position, where the fourth positions are located between the second and third positions.

That is, if the third power value corresponding to the third position and the second power value corresponding to the second position are both less than the first power value corresponding to the first position, it can be inferred that there is a position corresponding to the maximum power value between the second and third positions. Therefore, the pan-tilt camera can be controlled to horizontally rotate to the fourth position between the second and third positions.

5) The server may identify the target fourth position as the one corresponding to the maximum value among several fourth power values, and use this target fourth position as a reference to control the pan-tilt camera device to rotate vertically. The server may determine the fifth position corresponding to the maximum power value in the vertical direction.

Among the several fourth positions, the server may choose the one with the maximum power value as the target fourth position. The target fourth position can be between the first and third positions, or between the first and second positions.

As shown in FIG. 3, the target fourth position is located between the first and third positions. Using this target fourth position as a reference, the server may control the pan-tilt camera device to rotate upwards or downwards to determine the fifth position corresponding to the maximum power value in the vertical direction.

The fifth position can be located above or below the target fourth position.

6) The server may, based on the fourth and fifth positions of the target, determine the optimal charging angle.

Here, based on the fourth and fifth positions of the target, the position point where the pan-tilt camera device is at the optimal charging location can be obtained. The optimal charging angle is the angle between the optimal charging position and the first position. For example, as shown in FIG. 3, if the fifth position is above the fourth position of the target, then the angle α between the fifth position and the first position is the optimal charging angle.

This example achieves a balance between charging and monitoring by pre-determining the monitoring range of the pan-tilt camera device and controlling the device to rotate within the established monitoring range to the target angle when the current battery level and current environment meet preset conditions, so that the photovoltaic panel is at the optimal charging angle. This addresses the issue related to the technology that cannot balance the installation position of the integrated solar panel charging angle and the optimal monitoring angle of the camera.

Figure 4:
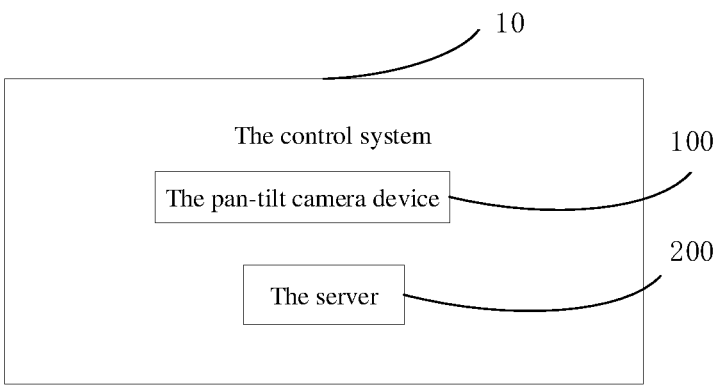
FIG. 4 is a structural diagram of one example of a pan-tilt camera system provided by this application.

Please refer to FIG. 4, which is a schematic diagram of the structure of the control system for the pan-tilt camera device provided by this application. The control system 10 comprises: a pan-tilt camera device 100 and a server 200. There is a communication connection between the pan-tilt camera device 100 and the server 200, such as through Bluetooth connection, wireless local area network connection, or communication connections of related technologies.

The pan-tilt camera device 100 can comprise: a camera, a motor, a battery, and a photovoltaic panel (such as a solar charging panel). The camera is used to acquire image data; the motor is used to control the movement of the pan-tilt camera device body up, down, left, and right; the battery is used to power the device's hardware; the solar charging panel is used to absorb solar energy and then convert it into electrical energy to charge the battery.

Figure 5:
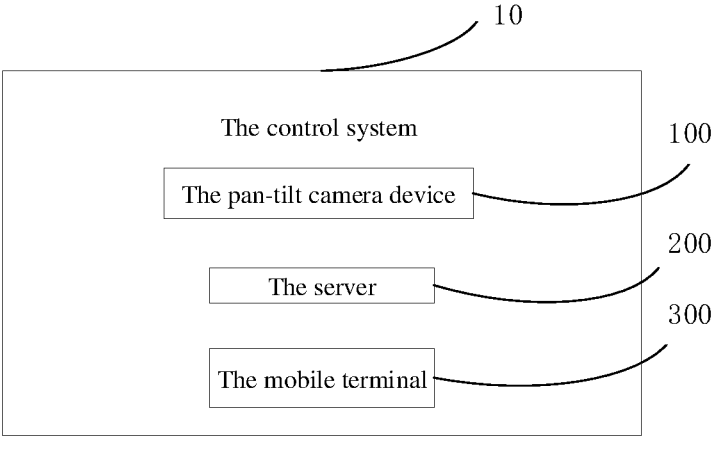
FIG. 5 is another structural diagram of a pan-tilt camera system provided by this application.

Optionally, the control system 10 may also comprise a mobile terminal 300. Please refer to FIG. 5, which is another schematic diagram of the structure of the control system for the pan-tilt camera device provided by this application. The mobile terminal 300 is connected to the pan-tilt camera device 100 and/or the server 200 and is used to send control commands to make the pan-tilt camera device 100 implement the aforementioned control method.

The mobile terminal 300 is used to play back the image data collected by the camera, and it transmits the positions of the key visual areas of the device on the image data to the client application of the operating system of the pan-tilt camera device 100.

The key monitoring areas can be preset on the mobile terminal 300 (such as an app (e.g., an application), for example, after the user first installs the pan-tilt camera device, they can set up the key monitoring areas on the mobile terminal 300. Additionally, users can either maintain the key monitoring areas set initially or adjust them according to actual conditions. If the user changes the key monitoring areas during the use of the pan-tilt camera device, the data related to the pan-tilt camera device will be re-collected, and the relationship between the angle of the adjusted key monitoring areas and the original angle will be used as a reference.

Generally speaking, within the first 24 hours after the user has installed the pan-tilt camera device, and during the daytime period, the device begins the data collection phase for solar charging. At every whole hour, the device will automatically rotate to collect current and voltage values, and calculate the maximum power value to determine the best charging angle for that particular hour. This is then combined with the multi-dimensional combination of the season, weather type, temperature, and wind speed on the day the pan-tilt camera device is used to determine the best charging angle under different combinations, as can be referred to in the related descriptions above.

It should be noted that when the control system 10 does not comprise the mobile terminal 300, the setting of the key monitoring area and the rotation command can be automatically adjusted on the pan-tilt camera device 100.

Figure 6:
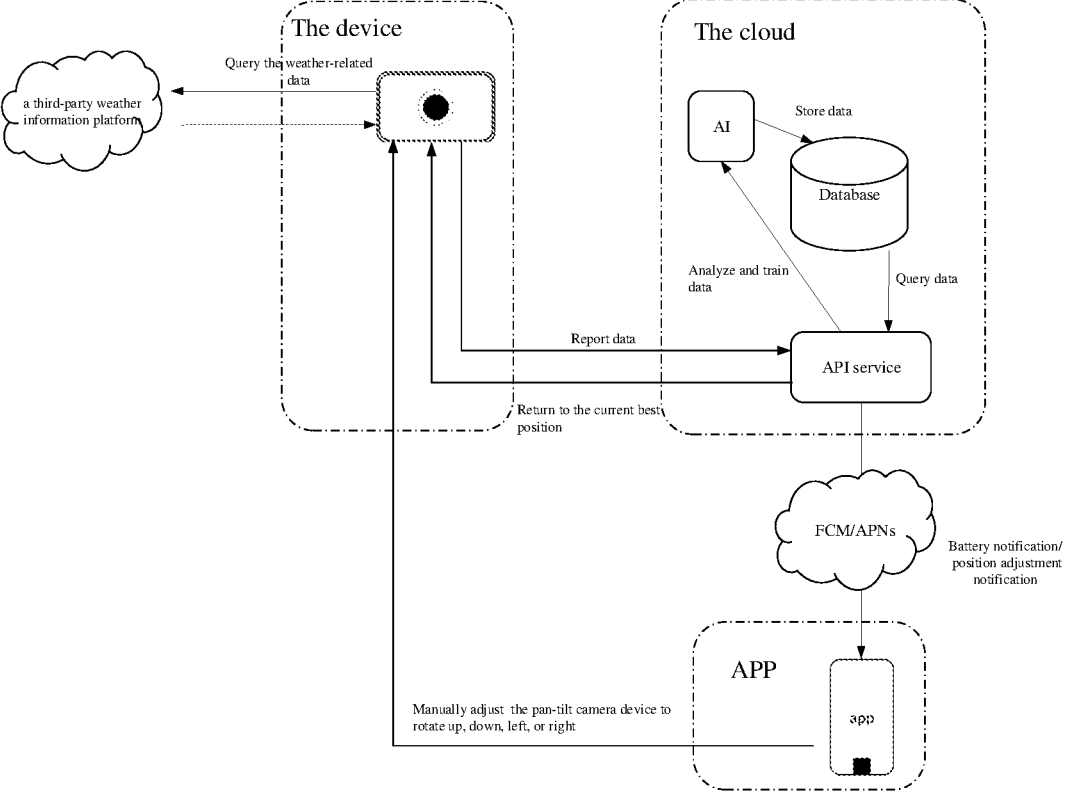
FIG. 6 is a flowchart illustrating an application scenario of a control method for a pan-tilt camera equipment provided by this application.

Refer to FIG. 6, the control system for the pan-tilt camera equipment comprises the pan-tilt camera equipment 100, server 200, and mobile terminal 300 as an example. It provides a schematic diagram of the process for a control method application scenario of the pan-tilt camera equipment, which specifically comprises the following processes:

(1) The device, namely the pan-tilt camera equipment, queries the current environment (which can be weather-related data, such as weather, temperature, wind force, humidity, and light intensity) through a third-party weather information platform and records the median values of charging current and charging voltage from t0 to t1 (e.g., within 2 minutes), as well as the current offset angles of the pan-tilt camera equipment from the horizontal and vertical lines and the current timestamp.

(2) The device packages and sends the obtained current environment data (which can be weather-related data, such as weather, temperature, wind force, humidity), current battery level, median values of charging current and charging voltage, the current offset angles of the pan-tilt camera equipment from the horizontal and vertical lines, and the current timestamp through an HTTP request to the server (e.g., server 200) in the cloud (API service). The packaged data is analyzed and trained by artificial intelligence (AI) and stored in the database for subsequent data queries.

In the cloud, all data reported by the device is filtered by conditions. The data with the same weather, wind force, and temperature values are extracted, and then the one with the highest power value is selected. The angle corresponding to the maximum power value is taken as the target angle for each environment, and the target angles for each environment are placed in an optimal charging list (similar to an angle-environment relationship table) to generate a list of the highest power values for each time period as precise data. When the device queries for data, it retrieves the offset angle from the precise data. Meanwhile, each time the device uploads data to the cloud, and the cloud responds with the current optimal position, the device continues to obtain and report new position-related data to the cloud, so that the cloud can calculate the optimal position for the current moment in real-time. That is, the cloud repeatedly calculates from the new data uploaded by the device. If there is a value higher than the one in the precise data, it is replaced directly with the higher value, thus repeatedly training and making the data increasingly accurate.

(3) The cloud server (e.g., server 200), based on the current environmental feedback from the device, queries the database and returns the optimal charging angle to the device.

(4) The cloud server uses cloud messaging notification services (FCN/APNs) to send notifications to the APP, i.e., mobile terminal 300, regarding the battery level and position adjustment of the pan-tilt camera device.

(5) The APP can manually adjust the pan-tilt camera device to rotate up, down, left, or right, and send the command to the device, so that the pan-tilt camera device rotates within the monitoring range to the target angle, allowing the photovoltaic panel to be at the optimal charging angle, and achieving a balance between charging and monitoring.

Figure 7:
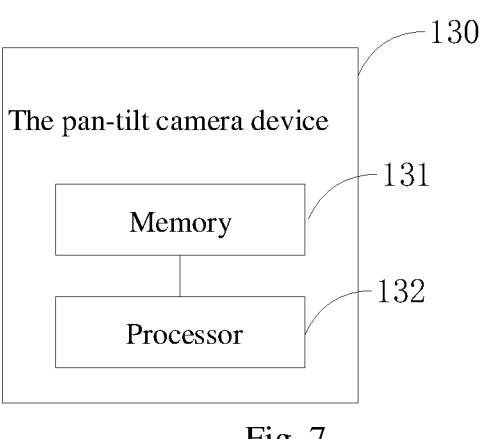
FIG. 7 is a structural diagram of one example of a device for controlling a pan-tilt camera equipment provided by this application.

Refer to FIG. 7, which is a schematic diagram of the structure of an example of the pan-tilt camera device provided by this application. The pan-tilt camera device 130 comprises a memory 131 and a processor 132. The memory

131 is used to store program data, and the processor 132 is used to execute the program data to implement the following method:

The server acquires the current battery level and current environment of the pan-tilt camera device. After determining that both the current battery level and current environment meet preset conditions, the server controls the pan-tilt camera device to rotate within the monitoring range to the target angle, so that the photovoltaic panel is at the optimal charging angle, achieving a balance between charging and monitoring, where the target angle is determined using the charging current value and charging voltage value of the photovoltaic panel.

It can be understood that the processor 132 is also used to execute program data to implement the method of any one of the aforementioned examples.

Figure 8:
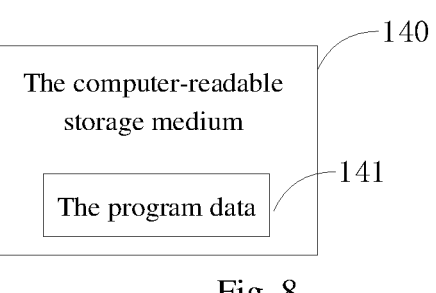
FIG. 8 is a structural diagram of one example of a computer-readable storage medium provided by this application.

Refer to FIG. 8, FIG. 8 is a schematic structural diagram of an example of a computer-readable storage medium provided in this application. The computer-readable storage medium 140 stores program data 141 (e.g., executable instructions). When executed by a processor, the program data 141 is used to implement the following method:

The server may obtain the current power level and current environment of the pan-tilt camera device. After determining that both the current power level and the current environment meet preset conditions, the server may control the pan-tilt camera device to rotate within the monitoring range to the target angle, so that the photovoltaic panel is at the optimal charging angle, achieving a balance between charging and monitoring, where the target angle is determined using the charging current value and charging voltage value of the photovoltaic panel.

It can be understood that when executed by a processor, the program data 141 is also used to implement the method of any of the aforementioned examples.

In the several examples provided in this application, it should be understood that the disclosed methods and devices can be implemented in other ways. For example, the device implementation modes described above are merely illustrative. For instance, the division of modules or units is only a logical functional division, and in actual implementation, there can be other division methods. For example, multiple units or components can be combined or integrated into another system, or some features can be ignored or not executed.

The units described as separate components may or may not be physically separated, and the components displayed as units may or may not be physical units, i.e., they can be located in one place or can be distributed across multiple network units. Some or all of the units can be selected based on actual needs to achieve the purpose of the example of this method.

The above are only the examples of this application and do not limit the patent scope of this application. Any equivalent structure or equivalent process transformation made using the contents of the specification and drawings of this application, or directly or indirectly applied in other related technical fields, are likewise comprised within the patent protection scope of this application.

What is claimed is:

1. A control method for a pan-tilt camera device, wherein the pan-tilt camera device comprises a photovoltaic panel configured to charge the pan-tilt camera device, the method comprising:

acquiring a current battery level and a current environment of the pan-tilt camera device; and after determining that both the current battery level and the current environment meet preset conditions, controlling the pan-tilt camera device to rotate within a monitoring range to a target angle, wherein the photovoltaic panel is at an optimal charging angle, and wherein the target angle is determined based on a charging current value and a charging voltage value of the photovoltaic panel.

2. The control method for the pan-tilt camera device according to claim 1, wherein controlling of the pan-tilt camera device to rotate within the monitoring range to the target angle comprises:

acquiring the target angle corresponding to the current environment after determining that both the current battery level and the current environment meet the preset conditions; and controlling the pan-tilt camera device to rotate within the monitoring range to the target angle.

3. The control method for the pan-tilt camera device according to claim 2, wherein acquiring the target angle corresponding to the current environment comprises:

acquiring an angle-environment relationship table, wherein the angle-environment relationship table is derived from power obtained using charging current values and charging voltage values of the photovoltaic panel at various angles under an environment matching the current environment, wherein the current environment has environmental parameters comprising at least one of season, weather type, temperature, humidity, light intensity and wind level; and obtaining the target angle corresponding to the current environment from the angle-environment relationship table.

4. The control method for the pan-tilt camera device according to claim 1, wherein controlling the pan-tilt camera device to rotate within the monitoring range to the target angle comprises:

after determining that the current battery level is below a preset level, and the current environment meets charging conditions for the photovoltaic panel, controlling the pan-tilt camera device to rotate within the monitoring range to the target angle.

5. The control method for the pan-tilt camera device according to claim 1, further comprising:

prior to controlling the pan-tilt camera device to rotate, determining a maximum field of view of the pan-tilt camera device, and a key monitoring area corresponding to the pan-tilt camera device, wherein the key monitoring area is within the maximum field of view; and based on the key monitoring area and the maximum field of view, determining the monitoring range, wherein the monitoring range is within the maximum field of view, and wherein after determining that the pan-tilt camera device rotates within the monitoring range, the key monitoring area is within a current field of view of the pan-tilt camera device.

6. The control method for the pan-tilt camera device according to claim 5, further comprising:

after determining the monitoring range using the key monitoring area and the maximum field of view, controlling, within the monitoring range, the pan-tilt camera device to rotate horizontally and vertically to predetermined angles, and collecting the charging current value and the charging voltage value of the photovoltaic panel when the pan-tilt camera device rotates horizontally and vertically to each of the predetermined angles;

based on the charging current value and the charging voltage value, determining a power value; and based on the power value, determining the optimal charging angle.

7. The control method for the pan-tilt camera device according to claim 6, wherein controlling the pan-tilt camera device to rotate horizontally and vertically comprises:

controlling, within the monitoring range, the pan-tilt camera device to rotate horizontally to a first position, and collecting the charging current value and the charging voltage value of the photovoltaic panel at the first position to obtain a first power value;

controlling the pan-tilt camera device to rotate horizontally to a second position, and collecting the charging current value and the charging voltage value of the photovoltaic panel at the second position to obtain a second power value, wherein the second position is located on one side of the first position;

in response to the second power value being less than the first power value, controlling the pan-tilt camera device to rotate horizontally to a third position, and collecting the charging current value and the charging voltage value of the photovoltaic panel at the third position to obtain a third power value, wherein the third position is located on other side of the first position;

in response to the third power value being less than the first power value, controlling the pan-tilt camera device to rotate horizontally to a plurality of fourth positions, and collecting the charging current value and the charging voltage value of the photovoltaic panel at each of the plurality of fourth positions to obtain a fourth power value for each of the plurality of fourth positions, wherein the plurality of fourth positions are located between the second position and the third position; and based on the first power value, the second power value, the third power value and the fourth power value, determining the optimal charging angle by:

selecting a fourth position, from the plurality of fourth positions, corresponding to a maximum value of a plurality of fourth power values as a target fourth position, and using the target fourth position as a reference to control the pan-tilt camera device to rotate vertically, to determine a fifth position corresponding to a maximum power value in a vertical direction; and based on the target fourth position and the fifth position, determining the optimal charging angle.

8. A pan-tilt camera system, comprising:

a pan-tilt camera device including a battery housing for containing a battery, and at least one photovoltaic panel; and a server containing computer-readable instructions that, when executed by at least one processor of the server, cause:

acquiring a current battery level of the battery and a current environment of the pan-tilt camera device; and after determining that both the current battery level and the current environment meet preset conditions, controlling the pan-tilt camera device to rotate within a monitoring range to a target angle, wherein the photovoltaic panel is at an optimal charging angle, and wherein the target angle is determined based on a charging current value and a charging voltage value of the photovoltaic panel.

9. The pan-tilt camera system according to claim 8, further comprising:

a mobile terminal connected to the pan-tilt camera device for sending control instructions to enable the server to control the pan-tilt camera device.

10. The pan-tilt camera system according to claim 8, wherein the instructions, when executed by the at least one processor, further cause:

acquiring the target angle corresponding to the current environment after determining that both the current battery level and the current environment meet the preset conditions.

11. The pan-tilt camera system according to claim 10, wherein the instructions, when executed by the at least one processor, further cause:

acquiring an angle-environment relationship table, wherein the angle-environment relationship table is derived from power obtained using charging current values and charging voltage values of the photovoltaic panel at various angles under an environment matching the current environment, wherein the current environment has environmental parameters comprising at least one of season, weather type, temperature, humidity, light intensity and wind level; and obtaining the target angle corresponding to the current environment from the angle-environment relationship table.

12. The pan-tilt camera system according to claim 8, wherein the instructions, when executed by the at least one processor, further cause controlling the pan-tilt camera device to rotate within the monitoring range to the target angle by:

after determining that the current battery level is below a preset level, and the current environment meets charging conditions for the photovoltaic panel, controlling the pan-tilt camera device to rotate within the monitoring range to the target angle.

13. The pan-tilt camera system according to claim 8, wherein the instructions, when executed by the at least one processor, further cause:

prior to controlling the pan-tilt camera device to rotate, determining a maximum field of view of the pan-tilt camera device, and a key monitoring area corresponding to the pan-tilt camera device, wherein the key monitoring area is within the maximum field of view; and based on the key monitoring area and the maximum field of view, determining the monitoring range, wherein the monitoring range is within the maximum field of view, and wherein after determining that the pan-tilt camera device rotates within the monitoring range, the key monitoring area is within a current field of view of the pan-tilt camera device.

14. The pan-tilt camera system according to claim 13, wherein the instructions, when executed by the at least one processor, further cause:

after determining the monitoring range using the key monitoring area and the maximum field of view, controlling, within the monitoring range, the pan-tilt camera device to rotate horizontally and vertically to predetermined angles, and collect the charging current value and the charging voltage value of the photovoltaic panel when the pan-tilt camera device rotates horizontally and vertically to each of the predetermined angles;

based on the charging current value and the charging voltage value, determining a power value; and based on the power value, determining the optimal charging angle.

15. The pan-tilt camera system according to claim 14, wherein the instructions, when executed by the at least one processor, further cause controlling the pan-tilt camera device to rotate horizontally and vertically by:

controlling, within the monitoring range, the pan-tilt camera device to rotate horizontally to a first position, and collecting the charging current value and the charging voltage value of the photovoltaic panel at the first position to obtain a first power value;

controlling the pan-tilt camera device to rotate horizontally to a second position, and collecting the charging current value and the charging voltage value of the photovoltaic panel at the second position to obtain a second power value, wherein the second position is located on one side of the first position;

in response to the second power value being less than the first power value, controlling the pan-tilt camera device to rotate horizontally to a third position, and collecting the charging current value and the charging voltage value of the photovoltaic panel at the third position to obtain a third power value, wherein the third position is located on other side of the first position;

in response to the third power value being less than the first power value, controlling the pan-tilt camera device to rotate horizontally to a plurality of fourth positions, and collecting the charging current value and the charging voltage value of the photovoltaic panel at each of the plurality of fourth positions to obtain a fourth power value for each of the plurality of fourth positions, wherein the plurality of fourth positions are located between the second position and the third position; and based on the first power value, the second power value, the third power value and the fourth power value, determining the optimal charging angle by:

selecting a fourth position, from the plurality of fourth positions, corresponding to a maximum value of a plurality of fourth power values as a target fourth position, and using the target fourth position as a reference to control the pan-tilt camera device to rotate vertically, to determine a fifth position corresponding to a maximum power value in a vertical direction; and based on the target fourth position and the fifth position, determining the optimal charging angle.

16. An apparatus for controlling a pan-tilt camera device comprising a photovoltaic panel, the apparatus comprising:

one or more processors, and memory having executable instructions that, when executed by the one or more processors, cause the apparatus to:

acquire a current battery level and a current environment of the pan-tilt camera device; and after determining that both the current battery level and the current environment meet preset conditions, control the pan-tilt camera device to rotate within a monitoring range to a target angle, wherein the photovoltaic panel is at an optimal charging angle, and wherein the target angle is determined based on a charging current value and a charging voltage value of the photovoltaic panel.

17. The apparatus for controlling the pan-tilt camera device according to claim 16, wherein the instructions, when executed by the one or more processors, cause the apparatus to control the pan-tilt camera device to rotate within the monitoring range to the target angle by:

acquiring the target angle corresponding to the current environment after determining that both the current battery level and the current environment meet the preset conditions; and controlling the pan-tilt camera device to rotate within the monitoring range to the target angle.

18. The apparatus for controlling the pan-tilt camera device according to claim 17, wherein the instructions, when executed by the one or more processors, cause the apparatus to acquire the target angle corresponding to the current environment by:

acquiring an angle-environment relationship table, wherein the angle-environment relationship table is derived from power obtained using charging current values and charging voltage values of the photovoltaic panel at various angles under an environment matching the current environment, wherein the current environment has environmental parameters comprising at least one of season, weather type, temperature, humidity, light intensity and wind level; and obtaining the target angle corresponding to the current environment from the angle-environment relationship table.

* * * * *